United States Patent [19]

Löppönen

[11] Patent Number: 5,375,253
[45] Date of Patent: Dec. 20, 1994

[54] CALL CONTROL METHOD FOR A RADIO SYSTEM

[75] Inventor: Jussi Löppönen, Helsinki, Finland

[73] Assignee: Nokia Telecommunications Oy, Espoo, Finland

[21] Appl. No.: 70,311

[22] PCT Filed: Sep. 24, 1992

[86] PCT No.: PCT/FI92/00263
§ 371 Date: Jun. 3, 1993
§ 102(e) Date: Jun. 3, 1993

[87] PCT Pub. No.: WO/9307685
PCT Pub. Date: Apr. 15, 1993

[30] Foreign Application Priority Data

Oct. 3, 1991 [FI] Finland ................................ 914652

[51] Int. Cl.⁵ .......................................... H04B 7/005
[52] U.S. Cl. ................................ 455/54.1; 455/34.1; 379/58
[58] Field of Search .................. 455/34.1, 34.2, 54.1, 455/63, 67.1, 58.1, 58.2, 33; 379/58, 59, 60

[56] References Cited

U.S. PATENT DOCUMENTS

| | | | |
|---|---|---|---|
| 4,633,509 | 12/1986 | Scheinert | 455/33 |
| 5,148,548 | 9/1992 | Meche et al. | 455/34.1 |
| 5,218,630 | 6/1993 | Patsiokas et al. | 379/56 |

FOREIGN PATENT DOCUMENTS

| | | |
|---|---|---|
| 298750 | 1/1989 | European Pat. Off. |
| 438137 | 7/1991 | European Pat. Off. |

Primary Examiner—Curtis Kuntz
Assistant Examiner—Mary M. Lin
Attorney, Agent, or Firm—Cushman, Darby & Cushman

[57] ABSTRACT

A call control method for a radio system, wherein a half-duplex type mobile station (MS1, MS2) is commanded so as to clear a call on the radio channel of a base station (BS), by transmitting a disconnect signal to the mobile station (MS1, MS2) over the radio channel, the mobile station leaving the radio channel upon receiving the disconnect signal. In order to ensure that the disconnect signal is received by the mobile station, the field intensity received by the base station (BS) on the radio channel is measured immediately after the transmission of the disconnect signal, and the radio channel is released for the next call only when the measured field intensity falls below a predetermined threshold value.

4 Claims, 2 Drawing Sheets

CALL CONTROL METHOD FOR A RADIO SYSTEM

SUMMARY OF THE INVENTION

The invention relates to a call control method for a radio system, wherein a half-duplex type mobile subscriber radio station is commanded so as to clear a call on a radio channel of a base station, by transmitting a disconnect signal to the mobile subscriber radio station over the radio channel, the mobile subscriber radio station leaving the radio channel on receiving the disconnect signal.

BACKGROUND OF THE INVENTION

A half-duplex type transceiver transmits and receives on the same radio channel and is not able to receive while its own transmitter is in operation. This property of the half-duplex mobile radio may result in a situation in which the transmitter of the mobile radio is in operation when the call terminates during a call disconnect signal transmitted from the mobile exchange, and does not receive the disconnect signal but remains on the traffic channel even though the mobile exchange has cleared the call and released the traffic channel. The same channel can be allocated to a new call immediately after the release, and so the mobile radio remaining on the traffic channel after a preceding call may undesirably participate in the new call or at least hear the beginning of the call.

Previously, attempts have been made to solve this problem by transmitting special selective disconnect messages on the traffic channel in the beginning of the call, which messages command the mobile radios not associated with the current call to leave the channel. If the transmitter of the mobile radio remaining on the channel after the preceding call is still or again in operation even when such disconnect messages are being transmitted, the mobile radio does not receive the messages and will not leave the channel. Such disconnect messages can be transmitted continuously during the call, in which case they, however, deteriorate the call quality, causing short breaks.

SUMMARY OF THE INVENTION

The object of the invention is to avoid the above-mentioned problems of the prior art.

This is achieved by means of a call control method according to the invention, wherein the field intensity received by the base station on the radio channel is measured immediately after the transmission of the disconnect signal, and the radio channel is released for the next call only when the measured field intensity falls below a predetermined threshold value.

After the disconnect signal has been transmitted by the mobile exchange on the traffic channel, the base station immediately measures the field intensity on the channel. If the measured value is high enough, it is assumed that the transmitter of the mobile radio is in operation, and the channel is not released for the next call. After the carrier signal of the mobile radio has disappeared from the channel, which is detected as a decrease in the measured field intensity below a predetermined threshold value, a new disconnect signal is first transmitted and the channel is released for the next call. By the procedure according to the invention, the mobile radio cannot remain on the channel when the next call begins, and so no additional disconnect messages need to be transmitted during the call.

BRIEF DESCRIPTION OF THE DRAWINGS

In the following, the invention will be described in greater detail by means of illustrating embodiments with reference to the attached drawings, in which.

DETAILED DESCRIPTION OF A PREFERRED EMBODIMENT OF THE INVENTION

Figure 1:
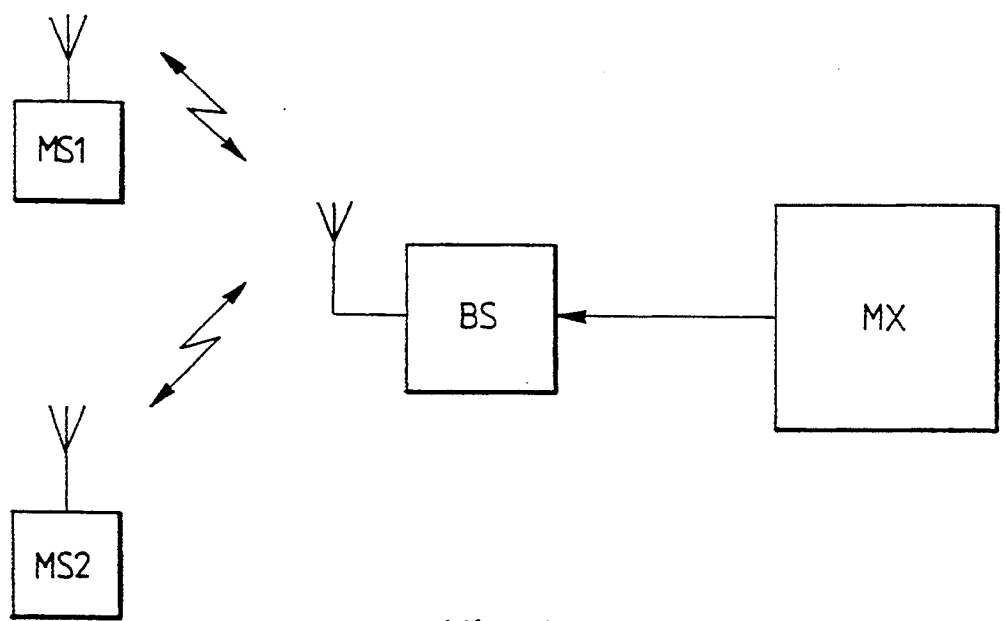
FIG. 1 illustrates a radio system in which the invention is applicable.

The radio system shown in the FIG. 1 comprises at least one fixed transceiver equipment BS, which will be referred to as a base station in this connection. The base station usually has several radio channels for communication purposes (pairs of transmitting and receiving frequencies), a separate transceiver unit being assigned for each radio channel. At least one radio channel is a so-called control channel for control signalling between the base station BS and mobile radios stations MS. The other radio channels are usually so-called traffic channels through which actual speech or data connections are established, i.e. the calls between a specific mobile radio and another mobile radio of the same system or e.g. a subscriber of a public switched telephone network. The base station BS is connected to a mobile exchange MX or the like, through which the calls are switched to the base station BS. The system may contain several mobile exchanges MX communicating with each other and e.g. with the public switched telephone network, and several base stations are usually connected to the same mobile exchange. The operation of the entire system is usually controlled in a centralized manner by means of a special system controller (not shown).

One or more mobile transceivers, i.e. mobile radios MS1 and MS2 roam freely within the area of the mobile radio system. The mobile radios are of the so-called half-duplex type, i.e. they transmit and receive alternately on one and the same traffic channel frequency.

The call set-up and the selection of the base station usually take place by signalling on the control channel. This signalling may, be e.g., mobile radio signalling complying with the standard MPT 1327 issued by the British Department of Trade and Industry (DTI).

Figure 2B:
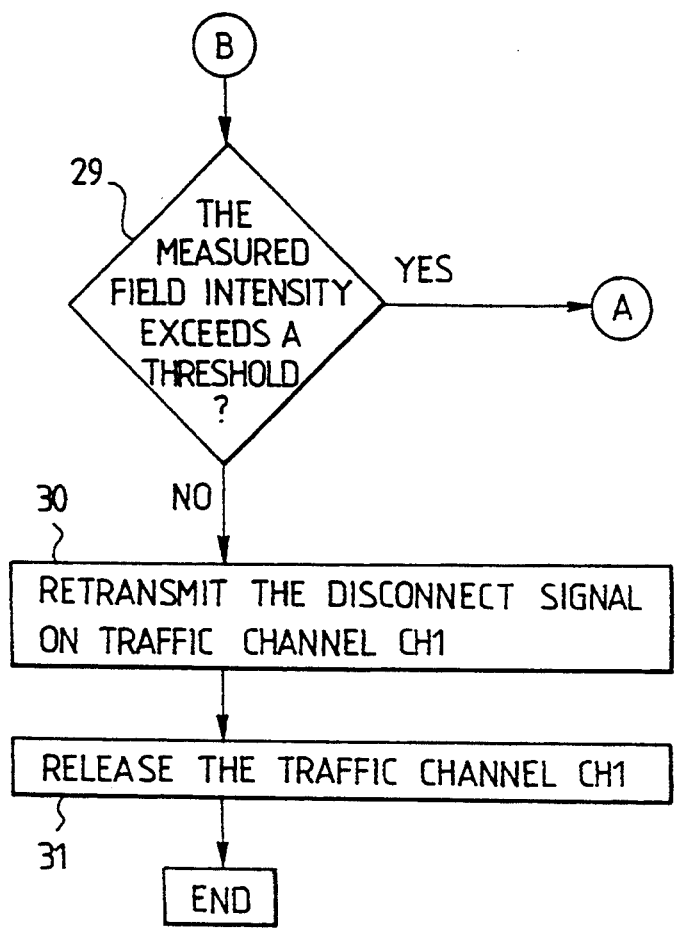
FIGS. 2A and 2B are flow charts illustrating practices of the method of the present invention.
Figure 2A:
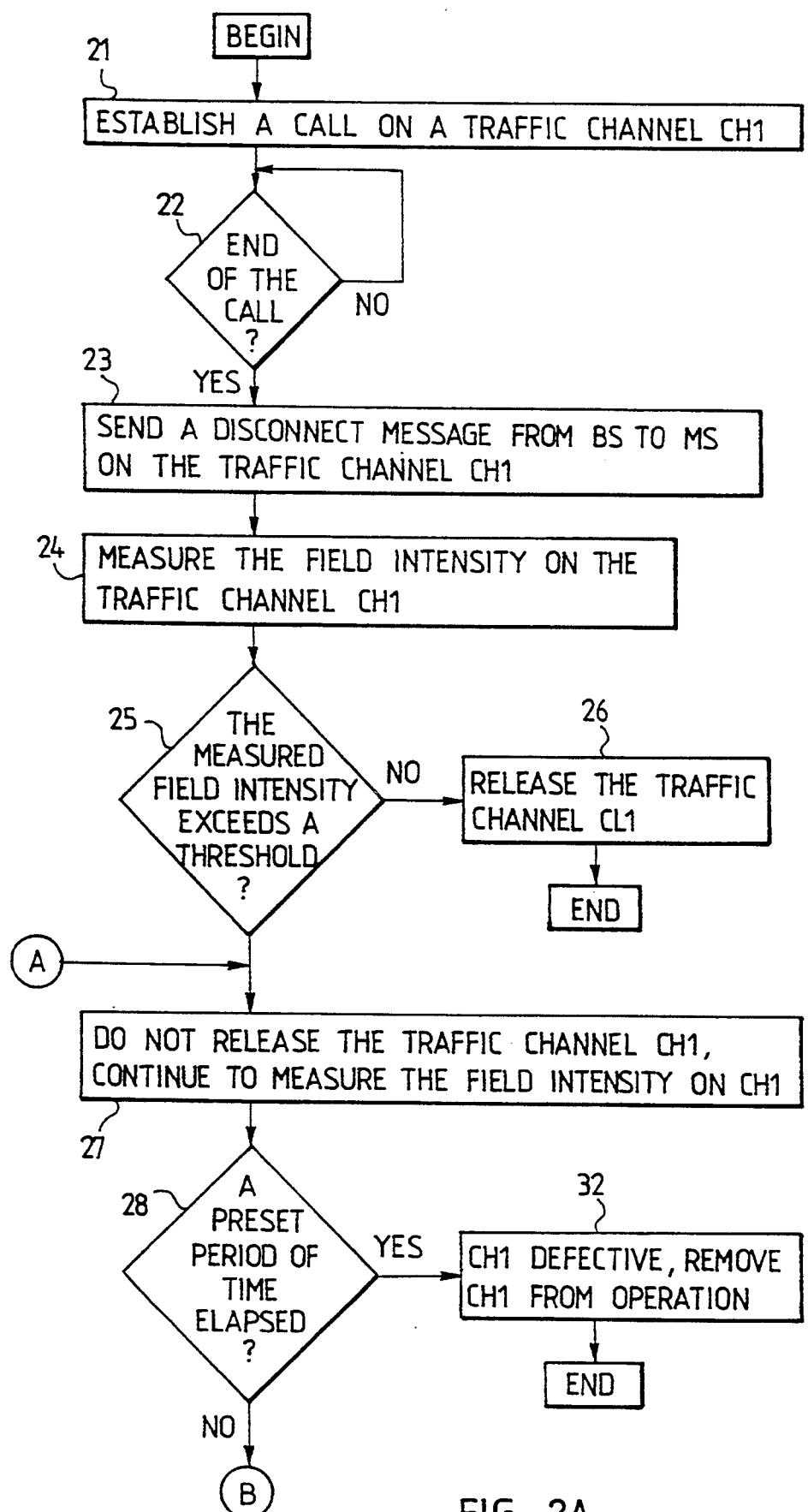

The invention relates to a situation in which a call already set up to a half-duplex type mobile radio is cleared by signalling on the traffic channel assigned to the call, and the traffic channel is released for the next call. Referring now to FIGS. 2A and 2B, according to the invention, this takes place as follows:

Assume that the mobile radio station MS1, for instance, has set up a speech or data connection, i.e. call, on a traffic channel Ch1 via the base station BS to the mobile exchange MX (FIG. 2A, step 21). When the call terminates (step 22), the mobile exchange MX transmits a special call disconnect signal or message on the traffic channel Ch1 to the mobile radio station MS1 via the base station BS (step 23), and when mobile radio station MS1 receives the signal or message, it terminates the transmission and reception on the traffic channel Ch1, thus releasing the channel for the next call. After the transmission of the disconnect signal the base station BS immediately measures the received field intensity on the traffic or radio channel Ch1 (step 24) so as to ensure that the mobile radio MS1 has received the disconnect signal and left the channel. If the field intensity measured by the BS on the radio channel Ch1 does not exceed a predetermined threshold value after the transmission of the disconnect signal (step 25), the radio channel is released immediately by the mobile exchange MX (step 26). If the field intensity measured by the base station BS exceeds the threshold value (step 25), it is assumed that the transmitter of the mobile radio station MS1 is still in operation on the channel Ch1, as a result of which the traffic channel Ch1 will not yet be released for the next call (step 27). Only when the carrier of the mobile radio MS1 again disappears from the traffic channel Ch1, which is detected as a decrease in the measured field intensity below the threshold value (FIG. 2B, step 29), a new disconnect signal is first transmitted (step 30) and the channel is released for the next call (step 31). In this way, it is ensured that the mobile radio MS will not remain on the traffic channel when the next call begins.

Certain radio systems set an upper limit for the duration of an uninterrupted transmission of the mobile radio station MS. For instance, the uninterrupted duration of transmission shall not exceed 60 seconds according to the above-mentioned MTP 1343 specification. In the embodiment of the method of the invention that is illustrated in FIGS. 2A and 2B, the traffic channel Ch1 (and the associated facilities) is assumed to be defective and is removed from operation (step 32) if the field intensity measured on the traffic channel does not fall below the set limit value during a predetermined period of time which is monitored in step 28 after the transmission of the disconnect signal. In the system complying with the MPT 1343 specification this period of time has to be at least about 60 seconds.

The invention has been described above by way of example by means of a specific radio system, to which, however, the invention is not intended to be restricted. Essential is only that the mobile radio is of the half-duplex type and the system clears the call by signalling on the traffic channel.

The drawings and the description related to them are also in other respects only intended to illustrate the present invention. In its details, the method according to the invention may vary within the scope of the attached claims.

I claim:

1. A call control method for a radio system, comprising:
    (a) transmitting a disconnect signal from a base station to a half-duplex mobile subscriber radio station over a radio channel during a call for commanding said mobile subscriber radio station to clear said call on said radio channel and for releasing said radio channel;
    (b) measuring a field intensity received by said base station on said radio channel immediately after the transmission of said disconnect signal;
    (c) releasing said radio channel immediately if the field intensity measured on said radio channel in step (b) does not exceed a predetermined threshold value immediately after said transmission of said disconnect signal;
    (d) retransmitting said disconnect signal to said mobile subscriber radio station on said radio channel if the field intensity measured on said radio channel in step (b) exceeds said threshold value and indicates transmission of said mobile subscriber radio station immediately after said transmitting of step (a); and
    (e) said mobile subscriber leaving said radio channel to be released in response to receipt of said disconnect signal.

2. The call control method according to claim 1, wherein:
    said step (d) of retransmitting said disconnect signal is executed immediately when the measured field intensity again falls below said threshold value after said transmitting of step (a).

3. The call control method according to claim 1, further comprising:
    assuming said radio channel is defective if the field intensity measured on said radio channel does not fall below said threshold value within a predetermined period of time after said transmitting of step (a), and thereupon treating said radio channel in said system as if it were defective.

4. The call control method according to claim 3, wherein:
    said predetermined period of time is at least about 60 seconds.

* * * * *

UNITED STATES PATENT AND TRADEMARK OFFICE
CERTIFICATE OF CORRECTION

PATENT NO.  : 5,375,253

DATED       : September 20, 1994

INVENTOR(S) : LOPPONEN, Jussi

It is certified that error appears in the above-identified patent and that said Letters Patent is hereby corrected as shown below:

On the title page, under item [86], correct the PCT No. to read --PCT/FI92/00253--.

Signed and Sealed this

Eighteenth Day of April, 1995

Attest:

BRUCE LEHMAN

*Attesting Officer*     Commissioner of Patents and Trademarks